US012767071B2

(12) United States Patent
Kim

(10) Patent No.: US 12,767,071 B2
(45) Date of Patent: Oct. 20, 2026

(54) POWER CONTROL APPARATUS AND METHOD FOR AN IN-VEHICLE ECU

(71) Applicants: HYUNDAI MOTOR COMPANY, Seoul (KR); KIA CORPORATION, Seoul (KR)

(72) Inventor: Dong Hwan Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 52 days.

(21) Appl. No.: 18/888,660

(22) Filed: Sep. 18, 2024

(65) Prior Publication Data

US 2025/0346198 A1 Nov. 13, 2025

(30) Foreign Application Priority Data

May 13, 2024 (KR) ........................ 10-2024-0062781

(51) Int. Cl.
*B60R 16/03* (2006.01)
*B60R 16/023* (2006.01)

(52) U.S. Cl.
CPC .......... *B60R 16/0231* (2013.01); *B60R 16/03* (2013.01)

(58) Field of Classification Search
CPC ............................ B60R 16/0231; B60R 16/03
USPC ............................................................ 701/36
See application file for complete search history.

(56) References Cited

U.S. PATENT DOCUMENTS 7,904,260 B2 3/2011 Burlak
8,760,832 B2 6/2014 Ueta
10,048,305 B2 8/2018 Iwasaki
11,474,161 B2 10/2022 Sakurai
2010/0253413 A1* 10/2010 Wu ........................ H02H 9/001 327/401
2012/0078389 A1* 3/2012 Hashimoto ........... G06F 3/1285 700/22
2018/0102774 A1* 4/2018 Leong ................ H03K 17/0822
2021/0081159 A1* 3/2021 Kaneko ................. G06F 3/1446
2021/0300272 A1* 9/2021 Nishida ................ G01R 31/371
2022/0140620 A1* 5/2022 Kang ....................... B60L 58/22 320/118

(Continued)

FOREIGN PATENT DOCUMENTS

JP 2018011419 A 1/2018
JP 2021157392 A * 10/2021 .......... H04L 67/568

OTHER PUBLICATIONS

Kaknevicius, Managing Inrush Current, May 2015, Texas Instruments (Year: 2015).*

*Primary Examiner* — Matthias S Weisfeld
(74) *Attorney, Agent, or Firm* — Lempia Summerfield Katz LLC

(57) ABSTRACT

A power control apparatus includes a main switch that supplies or cuts off power to in-vehicle electronic control units (ECUs). The power control apparatus also includes a backup switch that supplies or cuts off the power to the in-vehicle ECUs. The power control apparatus additionally includes a storage that stores a lookup table in which inrush current values respectively corresponding to the ECUs are recorded. The power control apparatus further includes a controller that collects ECU information on the in-vehicle ECUs, turns on the main switch when a sum of the inrush current values respectively corresponding to the ECUs exceeds a threshold current value, and turns on the backup switch at a preset time.

17 Claims, 8 Drawing Sheets

(56) References Cited

U.S. PATENT DOCUMENTS

| | | | |
|---|---|---|---|
| 2022/0173588 A1 | 6/2022 | Gajanayake | |
| 2022/0271559 A1 | 8/2022 | Shibata | |
| 2025/0191516 A1* | 6/2025 | An | G06F 1/03 |

* cited by examiner

| DIVISION | A | B | C | D | E | F | CURRENT |
|---|---|---|---|---|---|---|---|
| #1 | ○ | × | ○ | ○ | ○ | ○ | 90 |
| #2 | × | × | × | ○ | ○ | ○ | 80 |
| #3 | ○ | × | × | ○ | ○ | ○ | 87 |
| #4 | × | × | ○ | ○ | ○ | ○ | 88 |

FIG.2

| DIVISION | A | B | C | D | E | F | CURRENT |
|---|---|---|---|---|---|---|---|
| #1 | ○ | × | ○ (?) | ○ | ○ | ○ | 90 |
| #2 | × | × | × (5) | ○ | ○ | ○ | 80 |
| #3 | ○ | × | × (3) | ○ | ○ | ○ | 87 |
| #4 | × | × | ○ (8) | ○ | ○ | ○ | 88 |
| #5 | ○ | × | ○ (9) | ○ | ○ | ○ | 100 |

FIG.3

| | A | B | C | D | E | F | EXPECTED INRUSH CURRENT |
|---|---|---|---|---|---|---|---|
| | 6 | 2 | 5 | 80 | | | |
| FIRST VEHICLE | × | ○ | × | ○ | ○ | ○ | 82 |
| SECOND VEHICLE | × | ○ | ○ | ○ | ○ | ○ | 87 |
| THIRD VEHICLE | ○ | ○ | ○ | ○ | ○ | ○ | 93 |

FIG.4

POWER CONTROL APPARATUS AND METHOD FOR AN IN-VEHICLE ECU

CROSS-REFERENCE TO RELATED APPLICATION

This application claims the benefit of and priority to Korean Patent Application No. 10-2024-0062781, filed in the Korean Intellectual Property Office on May 13, 2024, the entire contents of which are hereby incorporated herein by reference.

TECHNICAL FIELD

The present disclosure relates to a technology for controlling power supplied to in-vehicle electronic control units (ECUs).

BACKGROUND

As the electrification of vehicle parts progresses rapidly, types of electronic devices mounted on a vehicle and the number of electronic devices mounted on a vehicle are greatly increasing. The electronic device may be used in a powertrain control system, a body control system, a chassis control system, a vehicle network, a multimedia system, and the like. The powertrain control system may include an engine control system, an automatic shift control system, and the like. The body control system may include a body electronic device control system, a convenience device control system, a lamp control system, and the like. The chassis control system may include a steering control system, a brake control system, a suspension control system, and the like. The vehicle network may include a controller area network (CAN), a FlexRay-based network, a media oriented system (MOST)-based network, and the like. The multimedia transport system may include a navigation device system, a telematics system, an infotainment system, and the like.

These systems and the electronic devices included in each of the systems are connected through the vehicle network, and the vehicle network for supporting each of functions of the electronic devices is required. The CAN may support a transmission rate of up to 1 Megabits per second (Mbps), and may support an automatic retransmission of collided frames, an error detection based on a cycle redundancy check (CRC), and the like. The FlexRay-based network may support a transmission rate of up to 10 Mbps, and may support a simultaneous data transmission through two channels, a synchronous data transmission, and the like. The MOST-based network, which is a communication network for high-quality multimedia, may support a transmission rate of up to 150 Mbps.

On the other hand, in the vehicle, a high transmission rate and system scalability are desired for the telematics system, the infotainment system, and improved safety system. However, the CAN and the FlexRay-based networks do not provide sufficiently high transmission rate and system scalability. The MOST-based network may support a higher transmission rate than the CAN-based network and the FlexRay-based network, but the MOST-based network may cause significant costs when the MOST-based network is applied to all networks of the vehicle. Due to these issues, an Ethernet-based network may be considered as the vehicle network. The Ethernet-based network may support a two-way communication through a pair of windings, and may support a transmission rate of up to 10 Gbps.

The electronic devices connected through the vehicle network include an ECU, and an intelligent power switch (IPS) is mainly used to supply a power to each of the ECUs or to cut off the power being supplied to each of the ECUs.

The IPS is a small-sized semiconductor chip that prevents unnecessary battery consumption by blocking dark current and also protects a load by blocking an overcurrent when the overcurrent flows through the load (i.e., the ECU).

The ECU includes a capacitor at a power input terminal for preventing noise. The capacitor acts as a cause of instantaneously generating a large current (i.e., an inrush current) when the capacitor is supplied with the power. In this process, the IPS recognizes the inrush current flowing through the ECU as the overcurrent and cuts off the power being supplied to the ECU based on an overcurrent protection logic.

As a result, even when the IPS that supplies the power to the in-vehicle ECUs recognizes the inrush current as the overcurrent and cuts off the power, it is required to continuously supply the power to each of the ECUs.

Matters described in this Background section are only intended to enhance understanding of the background of the present disclosure. Therefore, the Background section may include information that does form prior art that is already known to those having ordinary skill in the art to which the present disclosure pertains.

SUMMARY

The present disclosure has been made to solve the above-mentioned problems occurring in the prior art while advantages achieved by the prior art are maintained intact.

Aspects of the present disclosure provide a power control apparatus for in-vehicle ECUs that includes a lookup table in which inrush current values respectively corresponding to the ECUs are recorded, and a method thereof. The power control apparatus and method are capable of continuously supplying a power to each of the ECUs provided in a vehicle. The power control apparatus and method collect information on at least one ECU mounted on the vehicle. The power control apparatus and method turn on a main IPS when a sum of the inrush current values respectively corresponding to the ECUs exceeds a threshold current value and turning on a backup IPS at a preset time, such that the power is supplied by the backup IPS even though the main IPS cuts off the power due to an inrush current.

Other aspects of the present disclosure provide a power control apparatus for in-vehicle ECUs capable of continuously supplying power to each of the ECUs provided in a vehicle, and a method thereof. The power control apparatus and method receive activation information of a backup IPS from a vehicle management server. The power control apparatus and method determine a time point at which the backup IPS is turned on based on the activation information of the backup IPS when the power is supplied to the ECU mounted on the vehicle. The power control apparatus and method turn on the backup IPS at the time point, such that the power is supplied by the backup IPS even though the main IPS cuts off the power due to an inrush current.

Further aspects of the present disclosure provide a power control system for in-vehicle ECUs, that is capable of continuously supplying power to each of the ECUs by using a vehicle management server, and a method thereof. The vehicle management server receives a maximum current value for each of vehicles when a main IPS is turned off and ECU information from a plurality of vehicles, determines inrush current values respectively corresponding to the ECUs based on the maximum current value and the ECU information for each of the vehicles, and transmits a lookup table in which the inrush current values respectively corresponding to the ECUs are recorded to the vehicle. A power control apparatus of the in-vehicle ECUs collects information on at least one ECU mounted on the vehicle, turns on the main IPS when a sum of the inrush current values respectively corresponding to the ECUs exceeds a threshold current value, and turn on a backup IPS at a preset time, such that the power is supplied by the backup IPS even though the main IPS cuts off the power due to an inrush current.

Other aspects of the present disclosure provide a power control system for in-vehicle ECUs, that is capable of continuously supplying a power to each of the ECUs provided in the vehicle by using a vehicle management server, and a method thereof. The vehicle management server receives a maximum current value when a main IPS is turned off and ECU information from a plurality of vehicles, determines inrush current values respectively corresponding to the ECUs based on the maximum current value and the ECU information for each of the vehicles, transmits activation information of a backup IPS in which an activation time point of the backup IPS is recorded to a target vehicle. A power control apparatus of the ECU in the target vehicle receives the activation information of the backup IPS from the vehicle management server, determines a turn-on time point of the backup IPS based on the activation information of the backup IPS when the power is supplied to the ECU mounted on the vehicle, and turns on the backup IPS at the turn-on time point, such that the power is supplied by the backup IPS even though the main IPS cuts off the power due to an inrush current.

The objects of the present disclosure are not limited to the objects mentioned above. Other objects and advantages of the present disclosure that are not mentioned herein should be more clearly understood from the following description by those having ordinary skill in the art to which the present disclosure pertains. Additionally, it should be readily apparent that the objects and advantages of the present disclosure may be realized by the units and combinations thereof recited in the patent claims.

According to an aspect of the present disclosure, a power control apparatus for in-vehicle electronic control units (ECUs) is provided. The power control apparatus includes a main switch that supplies or cuts off a power of the in-vehicle ECUs, a backup switch that supplies or cuts off the power of the ECU, and storage that stores a lookup table in which inrush current values respectively corresponding to the ECUs are recorded. The power control apparatus also includes a controller configured to collect information on the in-vehicle ECUs, turn on the main switch when a sum of the inrush current values respectively corresponding to the ECUs exceeds a threshold current value, and then turn on the backup switch at a preset time.

According to an embodiment of the present disclosure, the controller may include a delay circuit that delays a time point at which a control signal for turning on the backup switch is transmitted to the backup switch.

According to an embodiment of the present disclosure, the controller may transmit a maximum current value and the ECU information to a vehicle management server when the main switch is turned off.

According to an embodiment of the present disclosure, the vehicle management server may receive the maximum current value and the ECU information from a plurality of vehicles, may determine an inrush current corresponding to each of the ECUs based on the maximum current value and the ECU information for each of the vehicles, may generate the lookup table in which the inrush current values respectively corresponding to the ECUs are recorded, and may transmit the lookup table to the vehicle.

According to an embodiment of the present disclosure, the vehicle management server may update a previously determined inrush current corresponding to each of the ECUs based on the maximum current value and the ECU information for each of the vehicles.

According to an embodiment of the present disclosure, the main switch and the backup switch may be implemented with an intelligent power switch (IPS).

According to another aspect of the present disclosure, a method for controlling a power of in-vehicle electronic control units (ECUs) is provided. The method includes storing, in a storage, a lookup table in which inrush current values respectively corresponding to the ECUs are recorded. The method also includes collecting, by a controller, information on the in-vehicle ECUs. The method additionally includes turning on, by the controller, a main switch when a sum of the inrush current values respectively corresponding to the ECUs exceeds a threshold current value and then turning on a backup switch at a preset time.

According to an embodiment of the present disclosure, storing the lookup table may include transmitting, by the controller, a maximum current value and ECU information to a vehicle management server when the main switch is turned off.

According to an embodiment of the present disclosure, storing the lookup table may further include receiving, by the vehicle management server, the maximum current value and the ECU information from a plurality of vehicles, determining, by the vehicle management server, an inrush current corresponding to each of the ECUs based on the maximum current value and the ECU information for each of the vehicles, generating, by the vehicle management server, the lookup table in which the inrush current values respectively corresponding to the ECUs are recorded, and transmitting, by the vehicle management server, the lookup table to the vehicle.

According to an embodiment of the present disclosure, determining the inrush current may further include updating a previously determined inrush current corresponding to each of the ECUs based on the maximum current value and the ECU information for each of the vehicles.

According to another aspect of the present disclosure, a power control apparatus for in-vehicle electronic control units (ECUs) is provided. The power control apparatus includes a main switch that supplies or cuts off a power of the in-vehicle ECUS, a backup switch that supplies or cuts off the power of the ECU, and a controller that receives information on an activation time point of the backup switch from a vehicle management server, turns on the main switch when the power is supplied to the ECU, and then turns on the backup switch based on the information on the activation time point of the backup switch.

According to an embodiment of the present disclosure, the controller may include a delay circuit that delays a time point at which a control signal for turning on the backup switch is transmitted to the backup switch.

According to an embodiment of the present disclosure, the controller may transmit a maximum current value and ECU information to the vehicle management server when the main switch is turned off.

According to an embodiment of the present disclosure, the vehicle management server may receive the maximum current value and the ECU information from a plurality of vehicles, may determine an inrush current corresponding to each of the ECUs based on the maximum current value and the ECU information for each of the vehicles, and may transmit activation information recording the activation time point of the backup switch to a target vehicle when a sum of inrush current values respectively corresponding to the ECUs provided in the target vehicle exceeds a threshold current value.

According to an embodiment of the present disclosure, the vehicle management server may update a previously determined inrush current corresponding to each of the ECUs based on the maximum current value and the ECU information for each of the vehicles.

According to an embodiment of the present disclosure, the main switch and the backup switch may be implemented with an intelligent power switch (IPS).

BRIEF DESCRIPTION OF THE DRAWINGS

The above and other objects, features, and advantages of the present disclosure should be more apparent from the following detailed description taken in conjunction with the accompanying drawings, in which:

FIG. 2 is a diagram illustrating an example of a maximum current value and ECU information received from a plurality of vehicles by a vehicle management server in a power control system of in-vehicle ECUS, according to an embodiment of the present disclosure;

FIG. 3 is diagram illustrating another example of a maximum current value and ECU information received from a plurality of vehicles by a vehicle management server in a power control system of in-vehicle ECUs, according to an embodiment of the present disclosure;

FIG. 4 is a diagram illustrating a process in which a vehicle management server in a power control system of in-vehicle ECUs determines an inrush current of each of vehicles based on the inrush current of each of the ECUs, according to an embodiment of the present disclosure.

DETAILED DESCRIPTION

Figure 1:
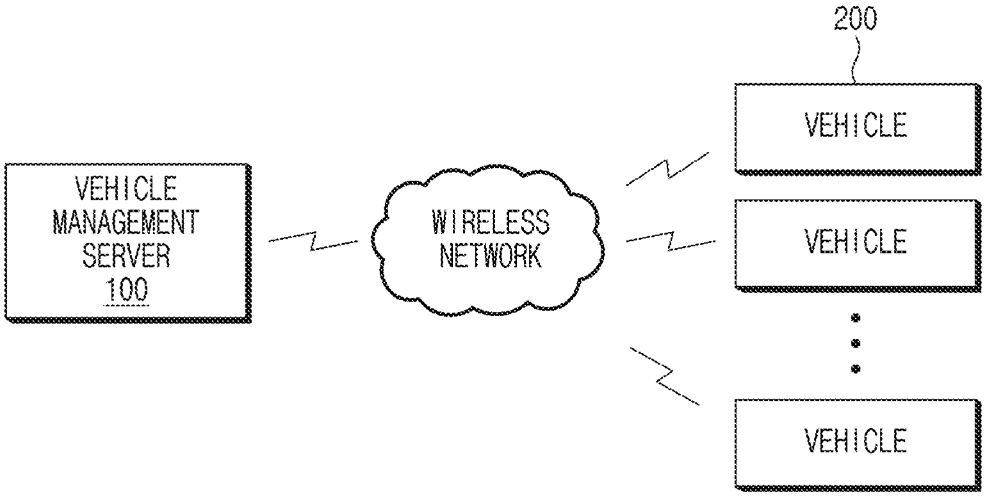
FIG. 1 is a configuration diagram of a power control system of in-vehicle ECUs, according to an embodiment of the present disclosure.

Hereinafter, embodiments of the present disclosure are described in detail with reference to the accompanying drawings. In adding the reference numerals to the components of each drawing, it should be noted that the identical or equivalent components are designated by the identical numeral even when the components are displayed on different drawings. Further, in the present disclosure, a detailed description of the related known configuration or function has been omitted when it was determined that the detailed description would obscure the gist of the present disclosure.

In the present disclosure, terms such as first, second, A, B, (a), (b), and the like may be used. These terms are merely intended to distinguish the components from other components. The terms do not limit the nature, order, or sequence of the components. Unless otherwise defined, all terms including technical and scientific terms used herein have the same meaning as commonly understood by one of ordinary skill in the art to which this disclosure pertains. It should be further understood that terms, such as those defined in commonly used dictionaries, should be interpreted as having a meaning that is consistent with their meaning in the context of the relevant art. The terms should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or perform that operation or function.

FIG. 1 is a configuration diagram of a power control system for in-vehicle ECUs, according to an embodiment of the present disclosure.

As illustrated in FIG. 1, the power control system of the in-vehicle ECUs according to an embodiment of the present disclosure may include a vehicle management server 100 and a plurality of vehicles 200.

The vehicle management server 100 may receive a maximum current value and ECU information of a time point when a main IPS 20 (illustrated in FIG. 5) is turned off from the plurality of vehicles 200. The vehicle management server 100 may also determine inrush current values respectively corresponding to the ECUs based on the maximum current value and the ECU information for each of the vehicles. The vehicle management server 100 may further generate a lookup table in which the inrush current values respectively corresponding to the ECUs are recorded. The vehicle management server 100 may transmit the lookup table to each of the vehicles. The ECU information may include an ECU ID. The maximum current value may mean a current value at the time when the main IPS 20 cuts off a power supplied to each of the ECUs.

The vehicle management server 100 may receive the maximum current value and the ECU information of the time point when the main IPS 20 is turned off from the plurality of vehicles 200. The vehicle management server 100 may also determine the inrush current corresponding to each of the ECUs based on the maximum current value and the ECU information for each of the vehicles. The vehicle management server 100 may transmit activation information of a backup IPS 30 (illustrated in FIG. 5) in which an activation time point of the backup IPS 30 is recorded to a target vehicle when a sum of inrush current values of the ECUs provided in the target vehicle among the plurality of vehicles exceeds a threshold current value. The threshold current means a current value recognized by the main IPS 20 as an overcurrent.

The vehicle management server 100 may manage the inrush current for each of the vehicles or for each option (i.e., type of the ECU) of each of the vehicles.

Hereinafter, a process in which the vehicle management server 100 determines the inrush current corresponding to each of the ECUs based on the maximum current value and the ECU information for each of the vehicles, according to an embodiment, is described with reference to FIGS. 2-4.

FIG. 2 is a diagram illustrating an example of a maximum current value and ECU information received from a plurality of vehicles by a vehicle management server in a power control system) for in-vehicle ECUs, according to an embodiment of the present disclosure.

As illustrated in FIG. 2, the vehicle management server 100 receives 90 Amperes (A) as the maximum current value and an ECU "A", an ECU "C", an ECU "D", an ECU "E", and an ECU "F" as the ECU information from a first vehicle #1. The vehicle management server 100 receives 80 A as the maximum current value and the ECU "D", the ECU "E", and the ECU "F" as the ECU information from a second vehicle #2. The vehicle management server 100 receives 87 A as the maximum current value and the ECU "A", the ECU "D", the ECU "E", the ECU "F" as the ECU information from a third vehicle #3. The vehicle management server 100 receives 88 A as the maximum current value and the ECU "C", the ECU "D", the ECU "E", the ECU "F" as the ECU information from a fourth vehicle #4. In this case, the ECU "D", the ECU "E", and the ECU "F" are ECUs commonly installed in all of the vehicles.

Because the ECU "D", the ECU "E", and the ECU "F" are common to all of the vehicles, the vehicle management server 100 may determine a combined inrush current of the ECU "A" and the ECU "C" as 10 A based on information of the first vehicle and information of the second vehicle. In this case, the inrush current of the ECU "A" and the inrush current of the ECU "C" may be assumed to be 5 A, respectively.

The vehicle management server 100 may determine the inrush current of the ECU "A" as 7 A based on the information of the second vehicle and the information of the third vehicle. In this case, because the combined inrush current of the ECU "A" and the ECU "C" is 10 A, the inrush current of the ECU "C" is 3 A. Accordingly, at the time when the information of the third vehicle is received, the vehicle management server 100 may determine the inrush current of the ECU "C" as 4 A, which is an average of 5 A and 3 A.

The vehicle management server 100 may first determine the inrush current of the ECU "C" as 8 A based on information of the fourth vehicle and the information of the second vehicle, and may determine the inrush current of the ECU "C" as 5.3 A, which is an average of 5 A, 3 A, and 8 A, and not as 8 A, at a time when the information of the fourth vehicle is received.

The number of times of updating the inrush current by the vehicle management server 100 may vary (e.g., depending on an intention of a designer). In an example, the vehicle management server 100 may determine the inrush currents of all of the ECUs except the common ECU. In addition, in an embodiment, when the inrush current is out of a standard deviation of 6σ, the vehicle management server 100 does not utilize the inrush current for updating.

FIG. 3 is diagram illustrating another example of a maximum current value and ECU information received from a plurality of vehicles by a vehicle management server in a power control system for in-vehicle ECUs, according to an embodiment of the present disclosure.

As illustrated in FIG. 3, it is shown that the ECU information of the first vehicle is the same as the ECU information of the fifth vehicle, but the maximum current values are different from each other.

In this case, the vehicle management server 100 may determine the combined inrush current of the ECU "A" and the ECU "C" as 20 A based on the information of the second vehicle and the information of the fifth vehicle, and may assume that the inrush current of the ECU "A" and the ECU "C" is 10 A, respectively.

Thereafter, the vehicle management 100 server may determine 9 A, which is an average of the previous inrush current 8 A and the present inrush current 10 A of the ECU "C", as a final inrush current of the ECU "C" at the time of receiving the information of the fifth vehicle.

FIG. 4 is a diagram illustrating a process in which a vehicle management server in a power control system for in-vehicle ECUs determines an inrush current of each of vehicles based on the inrush current of each ECU, according to an embodiment of the present disclosure.

As illustrated in FIG. 4, the inrush current of the ECU "A" is 6 A, the inrush current of the ECU "B" is 2 A, the inrush current of the ECU "C" is 5 A, and the inrush current of the common ECU is 80 A.

A first vehicle includes the ECU "B" and the common ECU, and thus, the inrush current of the first vehicle is 82 A. A second vehicle includes the ECU "B", the ECU "C", and the common ECU, and thus, the inrush current of the second vehicle is 87 A. A third vehicle includes the ECU "A", the ECU "B", the ECU "C", and the common ECU, and thus, the inrush current of the third vehicle is 93 A.

In this case, when the current recognized by the main IPS 20 as the overcurrent is, for example, 90 A, the vehicle management server 100 may recognize the vehicle "C" as the target vehicle and may transmit information on the activation time point of the backup IPS 30 (i.e., a time point at which the backup IPS 30 is turned on after the main IPS 20 is turned on) to the target vehicle.

In an embodiment, each of the plurality of vehicles 200 may include a plurality of ECUs 210, 220, and 230, a central communication unit (CCU) 240 and a power control apparatus 250 of the ECU. For better understanding, the first ECU 210, the second ECU 220, and the third ECU 230 are described as examples, but the types of the ECUs and the number of the ECUs may be different for each of the vehicles.

The CCU 240 may be a module that provides a communication interface with the vehicle management server 100. The CCU 240 may transmit the maximum current value and the ECU information to the vehicle management server 100. The CCU 240 may also receive the lookup table or the activation information of the backup IPS 30 from the vehicle management server 100.

The power control apparatus 250 of the ECU may receive the lookup table in which the inrush current values respectively corresponding to the ECUs are recorded from the vehicle management server 100. The power control apparatus 250 may collect information on each of the ECUs 210, 220, and 230 through a vehicle network. When the sum of the inrush current values respectively corresponding to the ECUs exceeds the threshold current value, the main IPS 20 may be turned on, and then the backup IPS 30 may be turned on at a preset time. In an embodiment, the preset time is just before the main IPS 20 is turned off from a turn-on state.

The vehicle network may include a controller area network (CAN), a CAN with flexible data-rate (CAN FD), a local interconnect network (LIN), a FlexRay, a media oriented systems transport (MOST), an Ethernet, and the like.

The power control apparatus 250 of the ECU may receive the activation information of the backup IPS 30 from the vehicle management server 100. The power control apparatus 250 may also determine a turn-on time point of the backup IPS 30 based on the activation information of the backup IPS 30 when the power is supplied to the ECUs 210, 220, and 230 mounted on the vehicle. The power control apparatus 250 may turn on the backup IPS 30 at the turn-on time.

Figure 5:
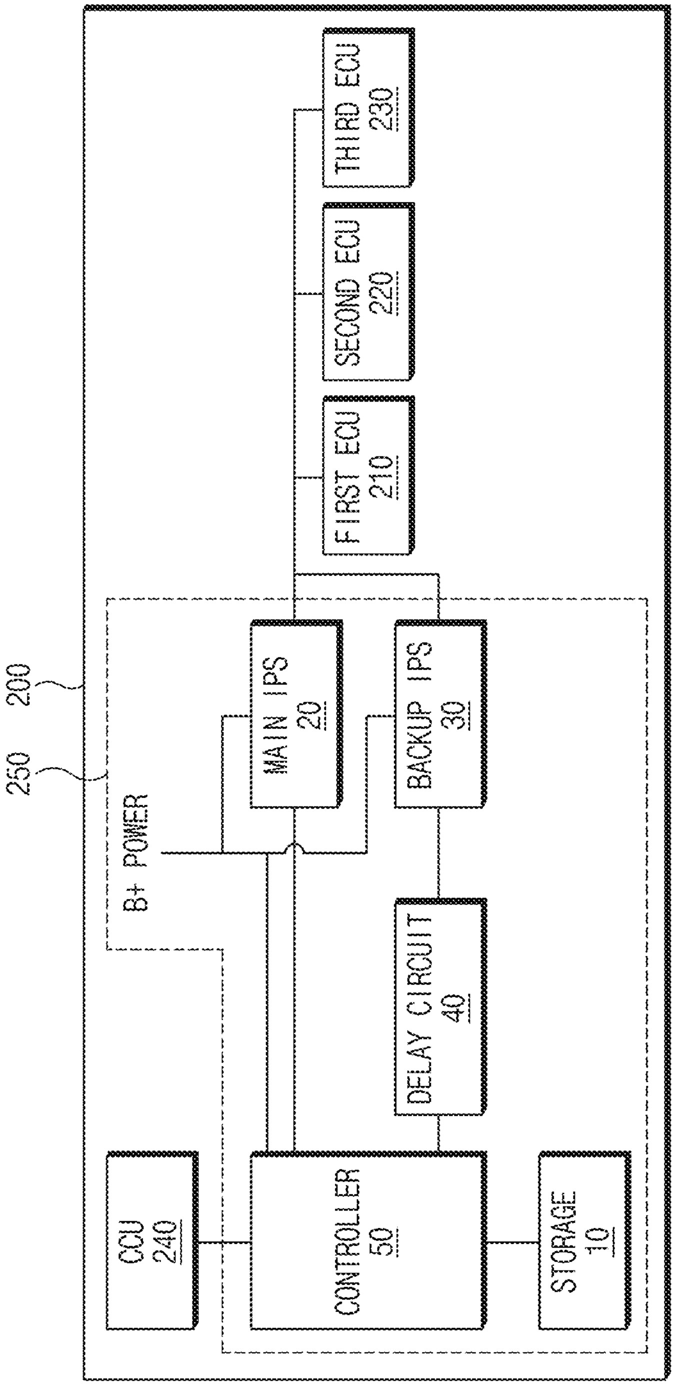
FIG. 5 is a configuration diagram of a power control apparatus of in-vehicle ECUs, according to an embodiment of the present disclosure.

FIG. 5 is a configuration diagram of a power control apparatus of in-vehicle ECUs, according to an embodiment of the present disclosure.

As illustrated in FIG. 5, the power control apparatus 250 of the in-vehicle ECUs according to an embodiment of the present disclosure may include storage 10, the main IPS 20, the backup IPS 30, a delay circuit 40, and a controller 50. In various embodiments, depending on implementation the power control apparatus 250 of the in-vehicle ECUs, the components of the power control apparatus 250 may be combined with each other to be implemented as one, or some components may be omitted.

The storage 10 may store the lookup table in which the inrush current values respectively corresponding to the ECUs are recorded.

The storage 10 may store the ECU information on each of the ECUs 210, 220, and 230 collected through the vehicle network. The storage 10 may also store various logics, algorithms, and programs required in a process in which the main IPS 20 is turned on, and then the backup IPS 30 is turned on at a preset time when the sum of the inrush current values respectively corresponding to the ECUs exceeds the threshold current value.

The controller 50 may receive the activation information of the backup IPS 30 from the vehicle management server 100 and may turn on the main IPS 20 when the power is supplied to the ECUs 210, 220, and 230 mounted on the vehicle. The controller 50 may determine the turn-on time point of the backup IPS 30 based on the activation information of the backup IPS 30. The controller 50 may execute various logics, algorithms, and programs stored in the storage 10. The storage 10 may store the various logics, algorithms, and programs required in the process of turning on the backup IPS 30.

The main IPS 20 may supply or cut off a B+ power (a battery constant power) to the ECUs 210, 220, and 230 in the vehicle.

The backup IPS 30 may supply or cut off the B+ power (a battery constant power) to the ECUs 210, 220, and 230 in the vehicle.

The delay circuit 40 may be positioned between the controller 50 and the backup IPS 30 to delay a control signal (i.e., a turn-on signal of the backup IPS 30) which is input to the backup IPS 30. A principle thereof, according to an embodiment, is as illustrated in FIG. 6.

Figure 6:
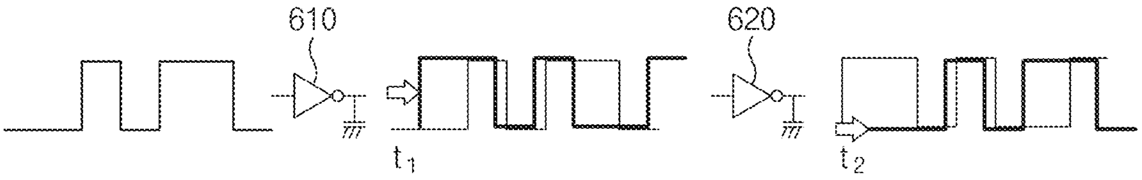
FIG. 6 is a diagram explaining an operation of a delay circuit provided in a power control apparatus of in-vehicle ECUS, according to an embodiment of the present disclosure.

FIG. 6 is a diagram illustrating an operation of a delay circuit provided in a power control apparatus of in-vehicle ECUS, according to an embodiment of the present disclosure. Although an example implemented as a separate configuration is described, the delay circuit may be included in, or implemented by, the controller 50.

As illustrated in FIG. 6, the delay circuit 40 provided in the power control apparatus 250 may include a plurality of inverters, including a first inverter 610 and a second inverter 620. Each of the inverters 610 and 620 may invert an input signal to cause a propagation delay.

The first inverter 610 may delay an initial input signal by $t_1$, and the second inverter 620 may additionally delay the initial input signal by $t_2$, that is previously delayed by $t_1$, thereby delaying the initial input signal by $t_1+t_2$. In some examples, the delay circuit may include additional inverters connected in series to further increase a delay time. For example, when the delay time of one inverter is t, six inverters may be connected in series to delay the input signal by 6t.

In an embodiment, setting the delay time is important because the backup IPS 30 must be turned on just before the main IPS 20 recognizes the inrush current as the overcurrent and blocks the current supplied to each of the ECUs 210, 220, and 230 such that an uninterrupted current may be supplied to each of the ECUs 210, 220, and 230.

The controller 50 is electrically connected to each of the components of the power control apparatus 250, and may perform overall control such that each of the components may normally perform a function thereof. The controller 50 may be implemented in the form of hardware, software, or a combination of hardware and software. The controller 50 may be implemented with a microprocessor, but the present disclosure is not limited thereto. In addition, the controller 50 may include an analog to digital converter (ADC) port and at least one general purpose input output (GPIO) port.

The controller 50 may monitor the current supplied by the main IPS 20 or the backup IPS 30 to each of the ECUs 210, 220, and 230 through the ADC port.

The controller 50 may collect the ECU information on each of the ECUs 210, 220, and 230 through the vehicle network. When the sum of the inrush current values respectively corresponding to the ECUs exceeds the threshold current value, the main IPS 20 may be turned on, and then the backup IPS 30 may be turned on at the preset time.

When the controller 50 inputs the turn-on signal to the main IPS 20, the controller 50 also inputs the turn-on signal to the backup IPS 30. However, the turn-on signal input to the backup IPS 30 is delayed by the preset time by the delay circuit 40 and then is input to the backup IPS 30. Accordingly, the backup IPS 30 may be turned on just before the main IPS 20 is turned off.

In addition, the controller 50 collect may the information on each of the ECUs 210, 220, and 230 through a diagnostic communication. For example, the controller 50 may transmit a diagnostic message (e.g., 0X7DF) over the vehicle network and collect information (e.g., an ECU ID) on the ECU responding to the diagnostic message.

The controller 50 may receive the information on the activation time point of the backup IPS 30 from the vehicle management server 100, may turn on the main IPS 20 when the power is supplied to the ECUs 210, 220, and 230 mounted on the vehicle, and may then turn on the backup IPS 30 at the activation time point of the backup IPS 30.

Figure 7:
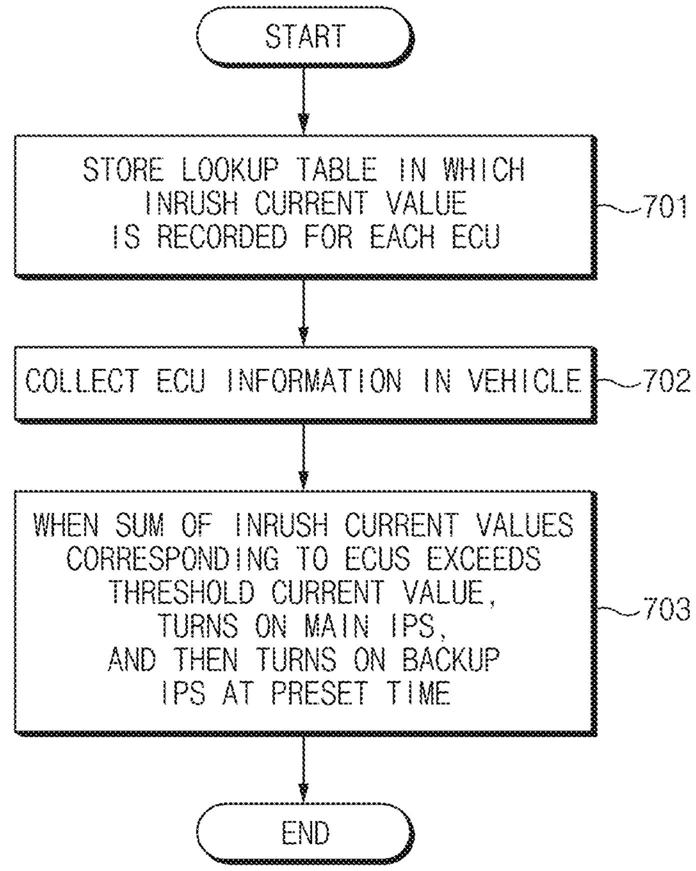
FIG. 7 is a flowchart of a method for controlling a power of in-vehicle ECUs, according to an embodiment of the present disclosure.

FIG. 7 is a flowchart of a method for controlling a power of in-vehicle ECUs, according to an embodiment of the present disclosure.

In an operation 701, the storage 10 stores the lookup table in which the inrush current values respectively corresponding to the ECUs are recorded. The lookup table may be provided from the vehicle management server 100. For example, the vehicle management server 100 may receive the maximum current value and the ECU information from the plurality of vehicles, may determine the inrush current corresponding to each of the ECUs based on the maximum current value and the ECU information for each of the vehicles, may generate the lookup table in which the inrush current values respectively corresponding to the ECUs are recorded, and may transmit the lookup table to each of the vehicles.

In an operation 702, the controller 50 collects the ECU information of the in-vehicle ECUs.

In an operation 703, when the sum of the inrush current values respectively corresponding to the ECUs exceeds the threshold value, the controller 50 turns on the main IPS 20, and then turns on the backup IPS 30 at the preset time.

Figure 8:
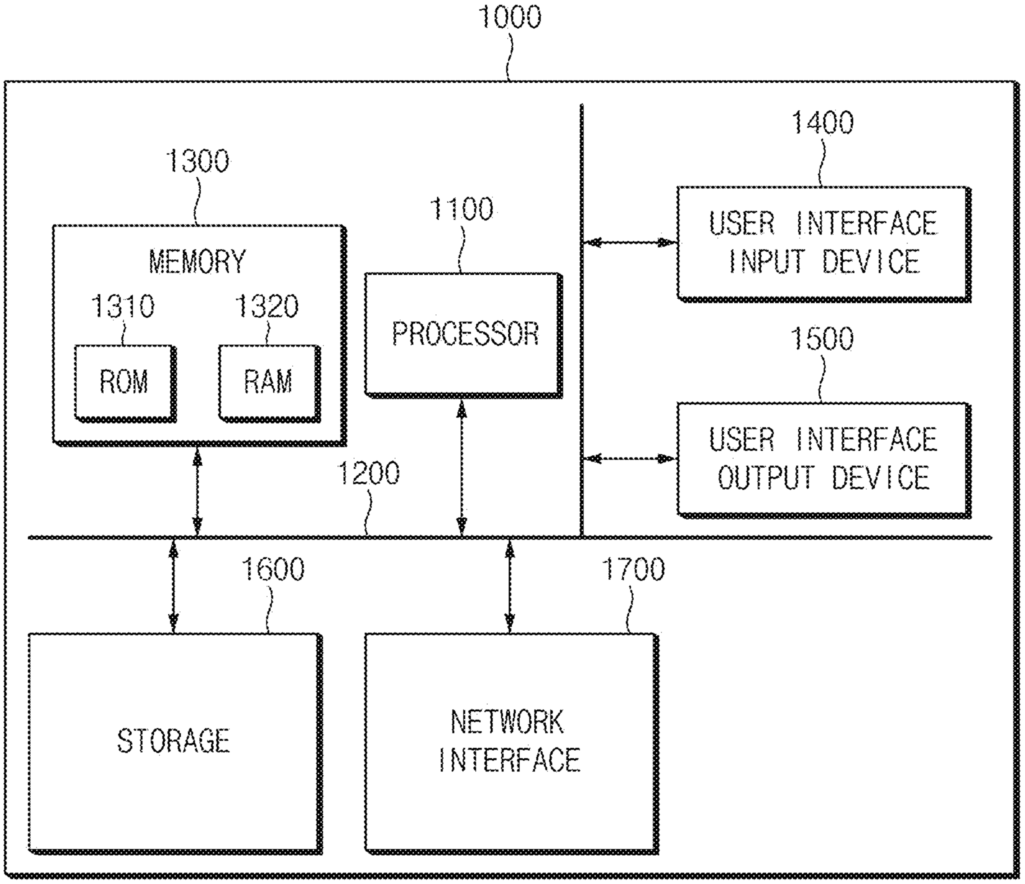
FIG. 8 is a block diagram illustrating a computing system for executing a method for controlling a power of in-vehicle ECUS, according to an embodiment of the present disclosure.

FIG. 8 is a block diagram illustrating a computing system for executing a method for controlling a power of in-vehicle ECUS, according to an embodiment of the present disclosure.

Referring to FIG. 8, the above-described method for controlling the power of the in-vehicle ECUs according to an embodiment of the present disclosure may also be implemented through a computing system 1000. The computing system 1000 may include at least one processor 1100, a memory 1300, a user interface input device 1400, a user interface output device 1500, storage 1600, and/or a network interface 1700.

The processor 1100 may be a central processing unit (CPU) or a semiconductor device which executes processing of instructions stored in the memory 1300 and/or the storage 1600. The memory 1300 and the storage 1600 may include various kinds of volatile or nonvolatile storage media. For example, the memory 1300 may include a read only memory (ROM) 1310 and/or a random access memory (RAM) 1320.

Accordingly, the step of the method or algorithm described in connection with embodiments disclosed herein may be directly implemented by hardware, a software module, or a combination of two thereof executed by the processor 1100. The software module may reside in a storage medium such as a RAM, a flash, a ROM, an erasable programmable read-only memory (EPROM), an electrically erasable programmable read-only memory (EEPROM), a register, a hard disk, or a removable disk, a CD-ROM (i.e., the memory 1300 and/or the storage 1600). An example storage medium is coupled to the processor 1100 that may read information from the storage medium and write the information to the storage medium. Alternatively, the storage medium may be integrated with the processor 1100. The processor 1100 and the storage medium may reside in an integrated on-demand circuit (ASIC). The ASIC may reside in the user terminal. Alternatively, the processor 1100 and the storage medium may reside as an individual component within the user terminal.

An embodiment of the present disclosure may provide the lookup table in which the inrush current values respectively corresponding to the ECUs are recorded, and may continuously supply the power to each of the ECUs provided in the vehicle by collecting the information on at least one ECU mounted on the vehicle, turning on the main IPS when the sum of the inrush current values respectively corresponding to the ECUs exceeds the threshold current value and turning on the backup IPS at the preset time, such that the power is supplied even though the main IPS cuts off the power due to the inrush current.

Hereinabove, although the present disclosure has been described with reference to example embodiments and the accompanying drawings, the present disclosure is not limited thereto. Rather, the present disclosure may be variously modified and altered by those having ordinary skill in the art to which the present disclosure pertains without departing from the spirit and scope of the present disclosure. Therefore, the embodiments of the present disclosure are not intended to limit the technical idea of the present disclosure. The scope of the technical idea of the present disclosure is not limited by such embodiments. The scope of protection of the present disclosure should be interpreted by the following claims, and all technical ideas within the equivalent scope should be interpreted as being included in the scope of the present disclosure.

What is claimed is:

1. A power control apparatus for in-vehicle electronic control units (ECUs), the power control apparatus comprising:

a main switch configured to supply or cut off a power of the in-vehicle ECUs;

a backup switch configured to supply or cut off the power of the in-vehicle ECUs;

a storage configured to store a lookup table in which inrush current values respectively corresponding to the in-vehicle ECUs are recorded; and a controller configured to collect ECU information on the in-vehicle ECUs, turn on the main switch when a sum of the inrush current values respectively corresponding to the in-vehicle ECUs exceeds a threshold current value, and turn on the backup switch at a preset time, wherein the preset time corresponds to a time at which the main switch is to be cut off due to an overcurrent condition, and wherein the inrush current values respectively corresponding to the in-vehicle ECUs are determined based on maximum current values and ECU information on the in-vehicle ECUs for each vehicle among a plurality of vehicles.

2. The power control apparatus of claim 1, wherein the controller includes a delay circuit configured to delay a time point at which a control signal for turning on the backup switch is transmitted to the backup switch.

3. The power control apparatus of claim 1, wherein the controller is configured to transmit a maximum current value and the ECU information to a vehicle management server when the main switch is turned off.

4. The power control apparatus of claim 3, wherein the vehicle management server is configured to:

receive the maximum current value and the ECU information from the plurality of vehicles;

determine an inrush current corresponding to each of the in-vehicle ECUs based on the maximum current value and the ECU information for each of the vehicles;

generate the lookup table in which the inrush current values respectively corresponding to the in-vehicle ECUs are recorded; and transmit the lookup table to the vehicle.

5. The power control apparatus of claim 4, wherein the vehicle management server is configured to update a previously determined inrush current corresponding to each of the in-vehicle ECUs based on the maximum current value and the ECU information for each of the vehicles.

6. The power control apparatus of claim 1, wherein the main switch and the backup switch are implemented with an intelligent power switch (IPS).

7. A method for controlling a power of in-vehicle electronic control units (ECUs), the method comprising:

storing, in a storage, a lookup table in which inrush current values respectively corresponding to the in-vehicle ECUs are recorded;

collecting, by a controller, ECU information on the in-vehicle ECUs;

turning on, by the controller, a main switch when a sum of the inrush current values respectively corresponding to the in-vehicle ECUs exceeds a threshold current value; and turning on a backup switch at a preset time, wherein the preset time corresponds to a time at which the main switch is to be cut off due to an overcurrent condition, and wherein the inrush current values respectively corresponding to the in-vehicle ECUs are determined based on maximum current values and ECU information on the in-vehicle ECUs for each vehicle among a plurality of vehicles.

8. The method of claim 7, wherein storing the lookup table includes transmitting, by the controller, a maximum current value and the ECU information to a vehicle management server when the main switch is turned off.

9. The method of claim 8, wherein storing the lookup table further includes:

receiving, at the vehicle management server, the maximum current value and the ECU information from the plurality of vehicles;

determining, at the vehicle management server, an inrush current corresponding to each of the in-vehicle ECUs based on the maximum current value and the ECU information for each of the vehicles;

generating, at the vehicle management server, the lookup table in which the inrush current values respectively corresponding to the in-vehicle ECUs are recorded; and transmitting, at the vehicle management server, the lookup table to the vehicle.

10. The method of claim 9, wherein determining the inrush current further includes updating a previously determined inrush current corresponding to each of the in-vehicle ECUs based on the maximum current value and the ECU information for each of the vehicles.

11. The method of claim 7, wherein the main switch and the backup switch are implemented with an intelligent power switch (IPS).

12. A power control apparatus for in-vehicle electronic control units (ECUs), the power control apparatus comprising:

a main switch configured to supply or cut off a power of the in-vehicle ECUs;

a backup switch configured to supply or cut off the power of the in-vehicle ECUs; and a controller configured to receive information on an activation time point of the backup switch from a vehicle management server, turn on the main switch when the power is supplied to the in-vehicle ECUs, and turn on the backup switch based on the information on the activation time point of the backup switch, wherein the activation time point corresponds to a time at which the main switch is to be cut off due to an overcurrent condition, and wherein inrush current values respectively corresponding to the in-vehicle ECUs are determined based on maximum current values and ECU information on the in-vehicle ECUs for each vehicle among a plurality of vehicles.

13. The power control apparatus of claim 12, wherein the controller includes a delay circuit configured to delay a time point at which a control signal for turning on the backup switch is transmitted to the backup switch.

14. The power control apparatus of claim 12, wherein the controller is configured to transmit a maximum current value and ECU information to the vehicle management server when the main switch is turned off.

15. The power control apparatus of claim 14, wherein the vehicle management server is configured to:

receive the maximum current value and the ECU information from the plurality of vehicles;

determine an inrush current corresponding to each of the in-vehicle ECUs based on the maximum current value and the ECU information for each of the vehicles; and transmit activation information recording the activation time point of the backup switch to a target vehicle when a sum of inrush current values respectively corresponding to the in-vehicle ECUs provided in the target vehicle exceeds a threshold current value.

16. The power control apparatus of claim 15, wherein the vehicle management server is configured to update a previously determined inrush current corresponding to each of the in-vehicle ECUs based on the maximum current value and the ECU information for each of the vehicles.

17. The power control apparatus of claim 12, wherein the main switch and the backup switch are implemented with an intelligent power switch (IPS).

* * * * *